United States Patent [19]
Decker et al.

[11] 3,994,749
[45] Nov. 30, 1976

[54] VENT VALVE FOR NICKEL-CADMIUM ENERGY CELLS

[75] Inventors: Alfred Stanley Decker, Plantation; Robert Frank Stephenson, Lauderhill, both of Fla.

[73] Assignee: Motorola, Inc., Schaumburg, Ill.

[22] Filed: Aug. 21, 1975

[21] Appl. No.: 606,392

[52] U.S. Cl. .................................. 429/53; 220/209
[51] Int. Cl.² .......................................... H01M 2/12
[58] Field of Search ............ 136/178; 220/203, 209

[56] References Cited
UNITED STATES PATENTS

| | | | |
|---|---|---|---|
| 2,790,570 | 4/1957 | Hodges et al. | 136/178 |
| 3,484,301 | 12/1969 | Gray | 136/178 |
| 3,661,650 | 5/1972 | Flynn | 136/178 |
| 3,715,239 | 2/1973 | Walker et al. | 136/178 |

FOREIGN PATENTS OR APPLICATIONS

| | | | |
|---|---|---|---|
| 1,423,543 | 12/1966 | France | 136/178 |

Primary Examiner—Donald L. Walton
Attorney, Agent, or Firm—Margaret Marsh Parker; James W. Gillman

[57] ABSTRACT

A vent valve for electric energy cells requiring pressure relief capability for gases formed within the cells due to overcharging or other circumstances includes a cover plate for the internal structure of the cell which contains a central relief aperture. A vent cap is affixed to the cover plate with one or more vent ports being provided. A resilient seal is provided between the vent cap and the cover plate for controlling the release of the gases, the seal being die-cut of a suitable corrosion-resistant material and having two parallel plane surfaces which contact the cover plate and the closed end of the vent cap when the cap and plate are joined. The seal is preferably of a polygon configuration and its vertices contact the walls of the cap for fixed positioning. The vent path for the gases is through the aperture in the cover plate, between the cover plate and the resilient seal, and out through the vent ports.

9 Claims, 3 Drawing Figures

VENT VALVE FOR NICKEL-CADMIUM ENERGY CELLS

BACKGROUND OF THE INVENTION

This invention relates to the rechargeable electrical energy cells, such as nickel-cadmium cells, and more specifically to an improved venting valve arrangement for relieving excess gas pressure within such cells.

Under standard operating conditions, electrical energy cells such as nickel-cadmium cells, operate with internal pressure under an equilibrium condition and the container construction is designed to withstand the normally expected pressures which are generally several times that of atmospheric pressure. However, under certain conditions such as too-rapid charging, internal pressures may rise high enough to rupture the container. At one time, a rupturable diaphragm or membrane was utilized to prevent possible explosion of the container. Since, however, rupture of the sealing diaphragm also destroyed the usefulness of the cell, better devices for venting were devised which would relieve excess pressure, then reseal the interior. In most energy cells the negative terminal is provided in the form of a cup-shaped container or casing with the positive terminal being a central contact which is combined with an insulating element to form the top closure of the container. In prior structures, the positive terminal is generally comprised of a flat metal cover plate with a central aperture and a metal cap over the aperture with some form of molded resilient seal retained between the cover plate and the cap. These seals have taken many forms, some being elaborate constructions including metal spring structures combined with bonded resilient coatings. Other, less complex structures have embodied spherical configuration, for example, requiring selective positioning within the dimple in the vent cap, and still others being in the form of flattened discs having a thickened rim and requiring a seating ring around the aperture in the cover plate for positioning. The latter described disc arrangement has the advantage of essentially filling the cap and needs no positioning device but, because the leakage path is longer, requires a higher internal pressure before relief is obtained. All of the prior devices, however, have the disadvantage of being relatively expensive to produce and, in the case of the molded disc, because of the difficulty of curing small molded parts so as to achieve identical physical characteristics, even units from a single production lot would not relieve at exactly the same desired pressure.

SUMMARY OF THE INVENTION

It is therefore an object of the invention to provide an improved vent valve for energy cells such as nickel-cadmium batteries and specifically an improved vent valve arrangement which includes a seal which is simple and inexpensive to produce and at the same time provides highly consistent venting at lower pressures.

These objectives are achieved in the present invention by providing a vent valve arrangement for an energy cell which includes a simple but effective seal requires no special conformation in the metal structure of the valve. There are no small parts to mold and cure since the seal is die-cut from a sheet of suitable material which is relatively inexpensive to process or procure. Further, the seal is preferably in a polygon configuration whose vertices contact the side wall of the vent cap when the seal is inserted to render the same self-positioning. The thickness of the sheet is of a selected dimension so as to provide the proper pressure over the cover plate aperture when the valve is fully assembled. Since the operative pressure is largely determined by the leakage path, i.e., the distance from the edge of the cover plate aperture to the edge of the seal, the polygon design provides relief at a lower pressure than the referenced disc structure which fills the vent cap.

BRIEF DESCRIPTION OF THE DRAWING

FIG. 3 is a section view along the line 3—3 of the embodiment of FIG. 2a.

DETAILED DESCRIPTION OF A PREFERRED EMBODIMENT

Figure 1:
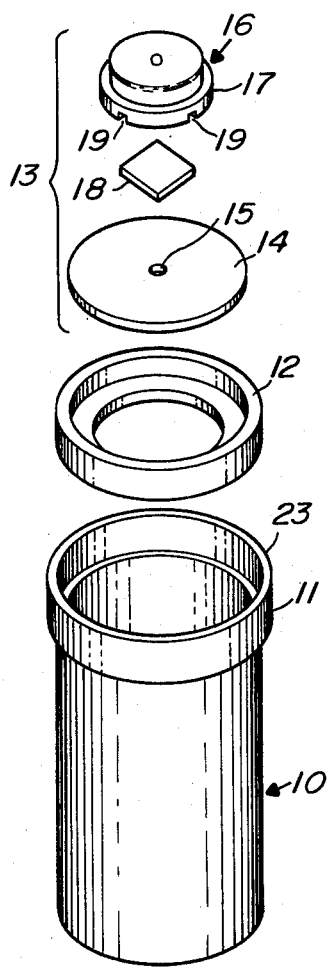
FIG. 1 is an exploded view of an energy cell constructed in accordance with the present invention.

The vent valve according to the invention may be best understood with reference to the drawing wherein like parts have like reference numerals in all figures.

Figure 2:
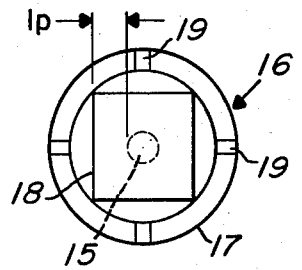
FIG. 2 is a plan view of three embodiments of the seal of the vent valve according to the invention, shown within the vent cap.
Figure 2:
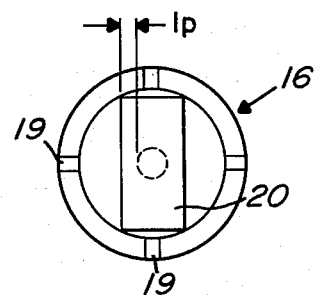
Figure 2:
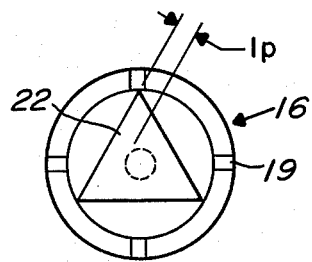
Figure 3:
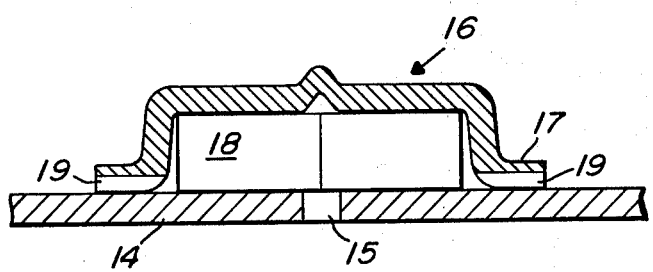

In FIG. 1 the container can 10 of the energy cell also serves as the negative terminal as is standard practice in the art. The can 10 is generally cylindrical with one end closed (this end is generally considered the bottom of the container). The top of the can is formed with a slightly larger diameter forming a shoulder portion 11. A ring 12 of a resilient material such as nylon having an L-shaped cross-section is seated on the shoulder 11 of the can 10 and the vent valve arrangement identified generally at 13 is pressure fitted into the ring 12. The valve arrangement 13 comprises three parts: a flat metal cover plate 14 having a central aperture 15, a generally cylindrical vent cap 16 having a closed end and a flange 17 on an open end, and a seal 18. Small channels or vent ports 19 are formed in the flange 17 for reasons which will be discussed hereinafter. The seal 18 is preferably of a polygon configuration and which in the embodiment shown is die-cut from a sheet of suitable corrosion-resistant elastomeric material. A preferred material is a rubber composition of 50-90 durometer hardness; 60 durometer generally being considered optimum. Since the rubber is formed and cured in sheet form, then die-cut, it is much less expensive than small, individually molded elements, while the uniformity of physical characteristics is much greater. The thickness of the sheet rubber comprising the seal 18 is chosen to provide the precise desired pressure on the aperture 15 of the cover plate 14 when the vent cap 16 and cover plate are welded together. The choice of the other dimensions of the seal 18 is, in one respect, determined by the inner diameter of the vent cap 16, since the central aperture in plate 14 must be covered and a sufficient number of vertices should contact the walls of the cap so as to provide fixed positioning of the seal. The type of polygon used to a large measure is determined by the desired relief pressure. Since the pressure at which the seal will release gas from the interior of the can is related to the leakage path, i.e., the shortest distance between the edge of the aperture 15 in the plate 14 to the edge of the vent seal 18, and designated $lp$ in FIG. 2, the specific polygon configuration will be chosen to provide a specific relief pressure. As is seen in FIG. 2, the leakage path $lp$ of any rectangular seal 20 other than a square will be less than that of the square seal 18, and may be more or less than the *lp* of a triangle 22, depending on the dimensions of each. The presently preferred seal is the square seal 18, based on current energy cell and container characteristics, but any regular or irregular polygon formed from cured sheet material may be considered as within the spirit and scope of the invention.

In the assembly, the internal components (not shown) which provide the electrical energy of the cell by chemical action are inserted in the container can 10. (Internal electrical connections are also not shown.) The seal 18 is inserted in the vent cap 16 and the cap is welded to the cover plate 14 to form the complete valve 13. The valve is then inserted into the nylon ring 12 with a pressure fit and the ring seated in the shoulder portion 11 of the container can 10. When the cell assembly is completed, the upper edge 23 of the can 10 is rolled or crimped down over the ring 12 to provide a permanent seal around the rim of the container can 10.

In operation, if the pressure inside the can 10 should rise above a desirable limit as, for example, under too-rapid charging conditions, the gases would be forced through the aperture 15 in the cover plate 14, inbetween the vent seal 18 and the cover plate and out of the cell by way of the vent ports 19. When the pressure is sufficiently reduced, the vent path will be self-resealed and gas will no longer leave the container.

Accordingly, what is claimed is:

1. In a sealed battery cell of the nickel-cadmium type having a generally outer casing forming one terminal of the cell, an improved vent valve arrangement serving as the other terminal of the cell, comprising in combination:

a disc-shaped, electrically conductive cover plate for a fixed positioning with the cell and having a central aperture therein;

an electrically conductive vent cap of a generally cylindrical conformation, having one end closed and having a flange formed on the other end;

a vent seal die-cut from resilient sheet material and inserted between the vent cap and the cover plate, having two parallel surfaces and a polygonal conformation with dimensions such that at least three vertices of the seal contact the walls of the vent cap for fixed positioning of the seal and the plane surfaces contact the cover plate and the closed end of the vent cap; and wherein, after insertion of the vent seal, the flange of the vent cap is permanently affixed to the cover plate, the assembled arrangement having therein at least one vent port for allowing excess gas to be vented from the cell.

2. A container according to claim 1 wherein the resilient vent seal is formed of rubber having a 50–90 durometer hardness.

3. A vent seal according to claim 2 wherein the material is of approximately 60 durometer hardness.

4. A container according to claim 1 wherein the resilient vent seal is of rectangular configuration.

5. A container according to claim 4 wherein the resilient vent seal has a square configuration.

6. A container according to claim 1 wherein the resilient vent seal is of triangular configuration.

7. A container according to claim 1 wherein the resilient vent seal is formed so that all vertices of the seal contact the walls of the vent cap.

8. A container according to claim 1 wherein the vent ports are formed in the vent cap.

9. A container according to claim 1 wherein the vent ports are formed between the flange of the vent cap and the cover plate.

* * * * *